Patented July 29, 1930

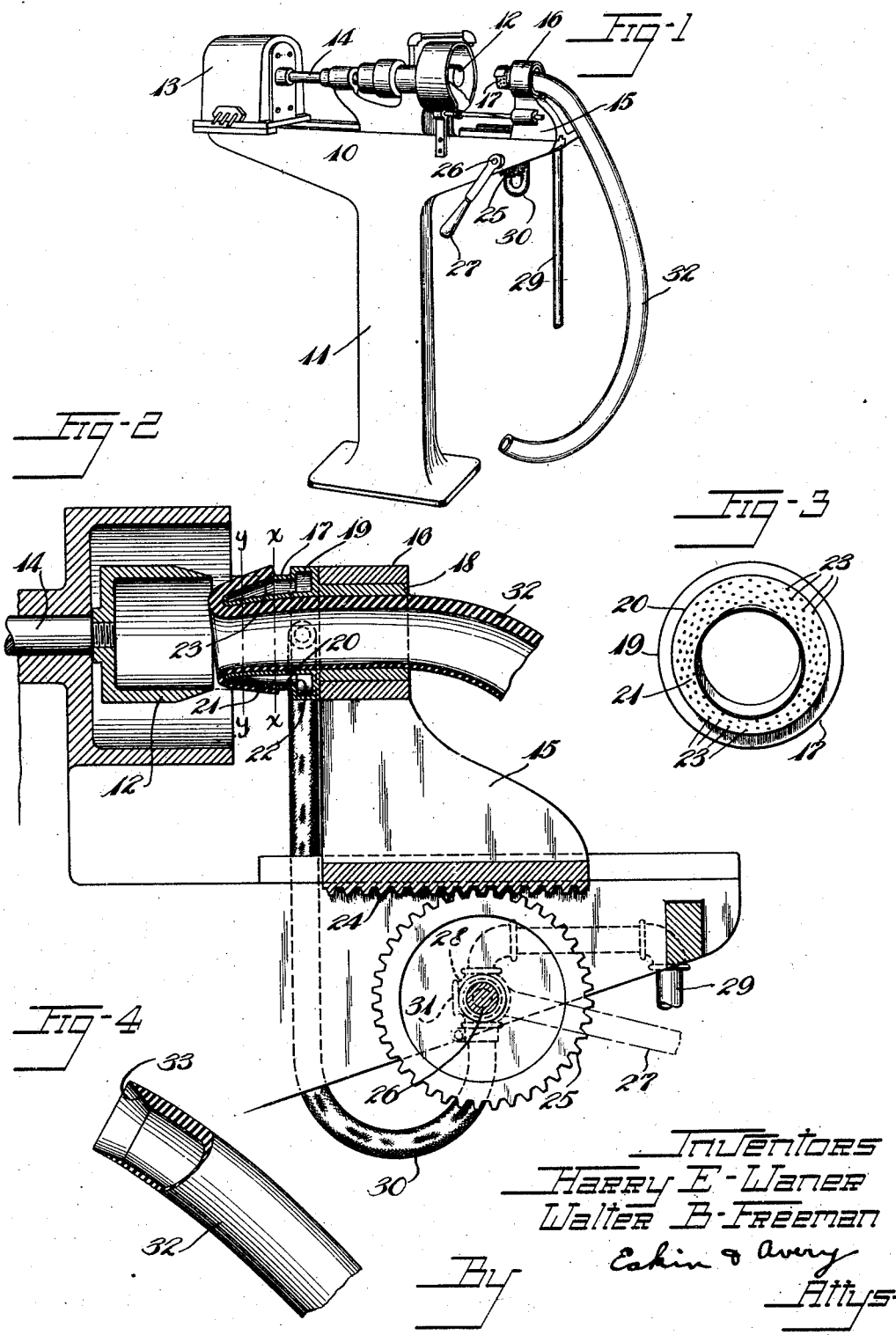

1,771,471

UNITED STATES PATENT OFFICE

HARRY E. WANER AND WALTER B. FREEMAN, OF AKRON, OHIO, ASSIGNORS TO THE B. F. GOODRICH COMPANY, OF NEW YORK, N. Y., A CORPORATION OF NEW YORK

TUBE-SKIVING APPARATUS

Application filed August 1, 1929. Serial No. 382,655.

This invention relates to apparatus for skiving the ends of lengths of tubular stock preparatory to splicing the ends to form annular tubular bodies, such for example as inner tubes for pneumatic tires, and more especially the invention relates to apparatus for skiving the ends of rubber tubes having non-uniform wall thickness.

In some of its aspects the invention is an improvement upon the subject matter of Patent No. 1,635,710, issued July 12, 1927, to Abram E. Falor and provides means whereby the apparatus of the said patent may be adapted for skiving tubes having walls of varying thickness.

Certain kinds of inner tubes are constructed with tread portions of relatively great thickness as a protection against punctures, and in the manufacture of such tubes difficulty has been experienced in obtaining skived ends with the annular, skived zone of uniform width, the skiving of the tubes being manually performed with resultant lack of uniformity inherent in such practice.

The chief object of this invention is to provide mechanical means for producing a skive of uniform width on the end of a tube having non-uniform wall thickness. Other objects will be manifest in the following specification.

Of the accompanying drawings:

Fig. 1 is a perspective view of apparatus embodying the invention in its preferred form.

Fig. 2 is a vertical longitudinal section through the operative parts of the apparatus.

Fig. 3 is a front elevation of the work-supporting part of the apparatus.

Fig. 4 illustrates an end portion of a tube that has been skived or beveled by means of our improved apparatus, a part of the tube being broken away and a part being in section.

Referring to the drawings, in Fig. 1 is shown a tube-skiving machine mounted upon a table 10 having a pedestal support 11, the machine consisting essentially of a rotatable cylindrical knife 12, a motor 13 operatively connected thereto by a shaft 14, and a carriage 15 slidably supported upon the table 10 and movable in the direction of the axis of rotation of the knife.

The carriage 15 is formed with an apertured bracket or head 16 in which is mounted a tubular nozzle or suction sleeve 17, the latter being substantially aligned with the axis of the knife 12. The nozzle 17 comprises a cylindrical shank portion 18 which is secured in the head 16, a circumferential flange or shoulder 19 at one end thereof abutting an outer face of the head 16, and a nose comprising a cylindrical portion 20 adjacent the flange 18 and a substantially frusto-conical portion 21 extending from the portion 20 to the end of the nose.

The annular wall of the nozzle 17 exclusive of its shank portion 18 is so constructed as to provide therein an annular chamber 22. The outer wall of the frusto-conical nose portion 21 is formed with a multiplicity of small apertures 23, 23, communicating with the chamber 22 as shown most clearly in Fig. 3.

The carriage 15 is formed on its bottom face with a downwardly presented rack 24 meshed with a pinion 25 mounted upon a rotatable shaft 26 which is suitably journaled in the frame of the table 10 and provided with an operating hand-lever 27. A 3-way valve 28 is positioned in alignment with the shaft 26 and suitably connected thereto so as to be turned concurrently with the pinion 25. The valve 28 is connected by a pipe or conduit 29 with a source of suction such as a vacuum pump, and is connected by a flexible pipe or conduit 30 with the chamber 22 of the nozzle 17, the valve also being provided with the usual relief port 31. The arrangement of the pinion 25, shaft 26 and valve 28 is such that when the lever 27 is moved to advance the carriage 15 toward the knife 12 the valve is manipulated to place the chamber 22 in communication with the suction pipe 29, and conversely, at the completion of the reverse movement of the carriage the port to the suction pipe 29 is closed and the chamber 22 then opened to the atmosphere through the relief port 31.

Substantially all of the foregoing description relates to prior art to which the applicants make no claim. The invention of this application resides in the novel and particular shape of the tubular nozzle 17, especially the shape of the nose portion thereof, which, when a tube of determinate non-uniform wall thickness, such as the tube 32, is passed through the nozzle and its end portion cuffed back over said nose portion, will so support the respective regions of the tube end, angularly with relation to the knife, that the latter will produce an annular skived zone of uniform width about the end of the tube on the inner periphery thereof. Such a skive is shown at 33, Fig. 4.

In tubes of varying wall thickness the variation may be uniform, as where the inner and outer peripheries of the tube comprise eccentrically disposed true circles, or, the varying thickness of the tube may be non-uniformly distributed, for example, the thickened region may be localized on one side of the tube. In either case the frusto-conical portion 21 of the nozzle 17 is so shaped as to effect the result described. If the variation of the wall thickness is uniform, then the shape of the outer face of the nose portion 21 will be the frustrum of a circular cone, the axis of which is obliquely disposed with relation to the axis of the knife, substantially as shown in Figs. 2 and 3. If the varying thickness of the tube is not uniform, the shape of the nose portion will be such that the knife will have substantially the same length of cut at all positions circumferentially about the tube.

The operation of the above described apparatus briefly is as follows. With the carriage in the retracted position shown in Fig. 1, one end of the rubber tube 32 is passed through the nozzle 17 and its end portion folded or cuffed back over the tapered portion 21 of the nose of the nozzle so that its end margin lies at the juncture of the tapered portion 21 and cylindrical portion 20 of the nozzle nose as indicated by the broken line $x$—$x$, Fig. 2. In mounting the tube on the nozzle it is important that the thickest portion of the tube be positioned upon the complemental portion of the nozzle nose, that is, the portion having the greatest taper.

The lever 27 is then pulled back to advance the carriage 15 so that the tube carried thereby is moved into operative relation with the rotating knife 12, and the valve 28 is actuated concurrently with the initial movement of the carriage to connect the chamber 22 with the suction line 29, with the result that the cuffed portion of the tube-end is drawn firmly against the surface 21 of the nozzle nose. As the tube-end is moved forward against the cutting edge of the rotating knife, the latter skives it in an annular zone extending from a plane $y$—$y$, Fig. 2 of the plane $x$—$x$. By reason of the angle at which the various portions of the tube are presented to the knife, the plane $y$—$y$ is parallel to the plane $x$—$x$ and a skive of uniform width is effected on the tube having non-uniform wall thickness.

The vacuum in chamber 22 is maintained during the skiving operation and is broken only when the carriage is retracted to its inoperative position. The tube with its end properly beveled is then readily removed from the nozzle, and the operations described may be repeated.

The invention obviates manual labor, and produces accurately and uniformly skived tubes which may have their ends spliced together to form inner tubes of a quality which is superior to those that are manually skived.

Although we have stated herein that the skive on the end of the tube is of uniform width, and in fact such is the ideal condition we strive to attain, it will be obvious that non-uniformity of the respective tubes to be skived may result in slight deviation from uniformity in the widths of the respective skives. However, we have found that some tolerance is permissible in the width of the skive without seriously affecting the quality of the article, so that it will be understood that the word "uniform" as used herein to describe the width of the skive refers to an ideal condition, and includes substantial uniformity which is within the permissible tolerance.

Our invention may be modified within the scope of the appended claims, as we do not limit our claims wholly to the specific construction shown and described.

We claim:

1. Tube-skiving apparatus comprising a rotary knife adapted to make an annular cut progressing in a direction parallel to its axis of rotation, and means for presenting the end of a tube of non-uniform wall thickness at an angle to the axis of rotation of the knife corresponding to non-uniform wall-thickness of the tube so that a skive of uniform width is effected on the tube end.

2. Tube-skiving apparatus comprising a rotary knife adapted to make an annular cut progressing in a direction parallel to its axis of rotation, a non-rotatable work support adapted to support the wall of a flexible tube of non-uniform thickness at an angle corresponding to its non-uniform wall thickness, and means for relatively moving the work support and knife into operative relation to cause the knife to skive the tube in an annular region of uniform width.

3. Tube-skiving apparatus comprising a rotary knife adapted to make an annular cut progressing in a direction parallel to its axis of rotation, a tubular, non-rotatable work support having a frusto-conical face the taper of which circumferentially thereof varies according to the thickness of a tube of non-uniform wall thickness mounted thereon, and means for relatively moving the work support toward and from the rotary knife to cause the knife to skive the tube in an annular region of uniform width.

4. Tube-skiving apparatus comprising a rotary knife adapted to make an annular cut progressing in a direction parallel to its axis of rotation, a tubular, non-rotatable work support having a work-supporting face which is a frustrum of a circular cone having its axis obliquely disposed with relation to the axis of rotation of the knife, and means for relatively moving the work support toward and away from the rotary knife to effect a skive of uniform width upon the end of a tube of non-uniform thickness determinately positioned upon said work-support.

In witness whereof we have hereunto set our hands this 29th day of July, 1929.

HARRY E. WANER.
WALTER B. FREEMAN.